March 8, 1966  H. LASSEN ETAL  3,238,584
WIRE ROPE CLAMP
Filed March 9, 1964

INVENTORS.
HENNING LASSEN and OLE ERNST.
BY
ATTORNEY.

United States Patent Office 3,238,584
Patented Mar. 8, 1966

3,238,584
WIRE ROPE CLAMP
Henning Lassen, Copenhagen, and Ole Ernst, Bronshoj, Denmark, assignors to A/S Malodan International Ltd., Copenhagen, Denmark
Filed Mar. 9, 1964, Ser. No. 350,291
Claims priority, application Denmark, Oct. 26, 1963, 5,052
3 Claims. (Cl. 24—125)

The invention relates to a wire rope clamp, particularly for securing wire rope to a thimble, and consisting of two assembled jaws, in which the abutting surfaces have grooves forming, in the assembled position of the jaws, a longitudinally wave-shaped tunnel adapted to clamp the wire rope parts.

The formerly known wire rope clamps of this kind achieve an efficient clamping of the wire in the wire rope clamp, and it is possible to obtain complete security against any slipping of the wire in the clamp. However, the strong drawing together of the jaws enclosing the wire rope parts causes the wire to be damaged, whereby the tensile strength of the wire is reduced appreciably. This reduction may reach a value of 30% of the tensile strength or more. All of the formerly known wire rope clamps of the kind described are so designed, that it is always possible to draw the jaws so hard together that a reduction of the tensile strength and a damage to the wire rope occurs.

While it has formerly been assumed that the wire parts should be drawn together as much as possible, the present invention is based on the discovery that a sufficient high transverse compression of the wire parts should be aimed at, so that the wire parts are prevented from slipping in relation to the wire rope clamp, while at the other side the transverse compression must not be strong enough to cause any damage to the wire rope parts. Tensile tests have shown that the wire always breaks in the interior of the wire rope clamp, when the jaws are drawn too tight together, and the fracture will under such conditions always occur at a pull which is considerably lower than the tensile strength of the wire rope.

Thus, the object of the invention is the provision of a wire rope clamp by which the optimum transverse compression, not too high and not too low, is automatically obtained.

This is according to the invention obtained by the fact that the jaws have abutting elements adapted to strike against each other thereby preventing further drawing together of the jaws, when the transverse compression of the enclosed wire rope parts has reached its optimum value.

Thus, the jaws may be drawn together until the abutting elements contact each other, whereafter further drawing together of the jaws is prevented. Thereby, the optimum transverse compression of the wire rope parts has automatically been obtained, and in this case the clamping force of the wire rope clamp will assume a value between 95–100% of the tensile strength of the wire. In this case, the wire rope parts will not suffer any damage from the compression, so that the tensile strength of the wire rope is practically not reduced. The wire rope clamp according to the invention is very reliable in use, as the operator has only to draw the jaws together until the abutting elements contact each other. Thus it is impossible to draw the jaws too hard together, and it is impossible to damage the wire rope parts.

In case of a wire rope clamp, by which the wave-shaped tunnel has over its entire length a uniform cross section, the width of which is equal to the diameter of the wire rope, the height of the cross section may according to the invention be about 80% of the total thickness of the enclosed wire rope parts, when the abutting elements are in contact with each other. Tensile tests have shown that the optimum transverse compression of the wire rope parts is obtained in this condition, so that the clamping force is sufficiently great, while at the other side the transverse compression has not given rise to any appreciable reduction of the tensile strength of the wire rope.

It may be concluded from the foregoing that a wire rope clamp according to the invention of a certain size can only be used for one single wire dimension. However, wires having the same diameter may be provided with either hemp heart or steel heart, and the wire rope clamp of the corresponding size must at any rate be able to compress the wire rope with a hemp heart sufficiently. Therefore, when this wire rope clamp is used for a wire rope with steel heart it may be impossible to clamp the jaws so tight together that the abutting elements of the jaws contact each other. Now, in order to avoid that the transverse compression causes damage to the wire rope parts and reduces the tensile strength of the wire, the jaws may according to the invention be drawn together by means of one or more Unbrako-screws located at each side of the wave-shaped tunnel. The Unbrako-screws are tightened in the usual way by means of a hexagon steel bar spanner being inserted into a hollow in the screw heads. As the spanner has a cross section area less than the cross section area of the screw shank, the spanner will break if an attempt is made to tighten the screws beyond the limit of the optimum tightening force. Thus, a protection of the wire rope against damage caused by exaggerated transverse compression has also in this case been automatically obtained.

Extensive experiments have shown that another cause of damage to the wire rope inducing a reduction of the tensile strength may be traced to a certain notch effect occurring at the end where the long wire rope part is entering the wire rope clamp, i.e. the end of the clamp turning away from the thimble, as at this point the maximum pull in the long wire rope part occurs. This notch effect may be reduced considerably, when according to the invention the wave height of the tunnel is decreasing in relation to the wave length towards the ends of the wire rope clamp. In fact, a flattening of the wave profile is needed only at one end of the wire rope clamp, i.e., at the end where the long wire rope part enters the clamp, but the operator should in this case take care to arrange the clamp correctly during assembling of the jaws. This necessity is eliminated, when the wave profile is flattened towards both ends of the wire rope clamp as indicated, whereby errors by the assembling will be completely avoided in advance.

In the drawing is shown an embodiment of a wire rope clamp according to the invention.

Figure 1:
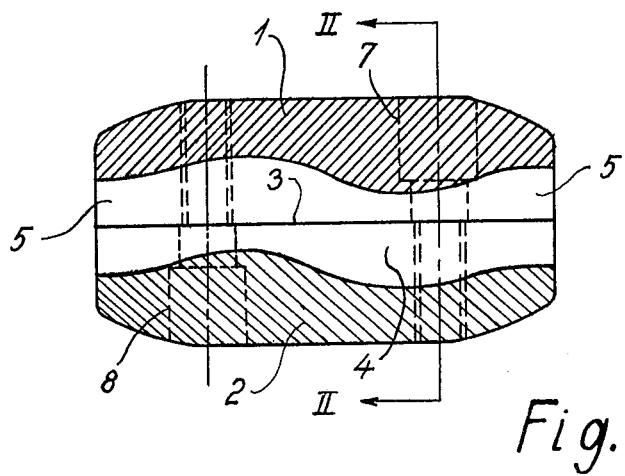
FIG. 1 is a longitudinal section of the wire rope clamp.
Figure 2:
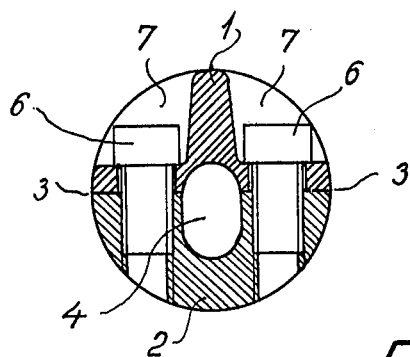
FIG. 2 is a section taken along the line II—II in FIG. 1.

The wire rope clamp consists of two jaws 1 and 2 forming the two halves of a sleeve split along a plane passing through the axis. The two jaws 1 and 2 have plane abutting surfaces 3 facing each other and serving as abutting elements during the drawing together of the jaws. The assembled jaws 1 and 2 contain a wave-shaped tunnel 4 for clamping the wire rope parts. It will be apparent from FIG. 1 that the wave profile is flattened towards the ends 5 of the wire rope clamp.

The jaws 1 and 2 are drawn together by means of four Unbrako-screws 6, the heads of which are received in cut-outs 7 in the jaw 1 and corresponding cut-outs 8 in the jaw 2.

The wave-shaped tunnel 4 has a substantially uniform cross section over its entire length, and the width of the cross section is equal to the diameter of the enclosed wire rope parts. The height of the cross section amounts to about 80% of the total thickness of the enclosed wire rope parts.

When the wire rope clamp is attached to the wire rope parts, the screws 6 are tightened, until the abutting surfaces 3 contact each other, whereby further tightening will become impossible. Hereby, an optimum transverse compression of the wire rope parts producing a clamping force of 95–100% of the tensile strength of the wire rope, has been obtained, and at the same time the transverse compression is restricted to a reasonable value which will not cause any appreciable reduction of the tensile strength of the wire rope. The flattening of wave profile towards the ends 5 of the wire rope clamp makes the notch effect at these points small enough to be without any practical importance.

We claim:
1. A wire rope clamp comprising a pair of elongated jaw members, each member having a smooth confronting face, an undulating groove in each face extending the full length of said member and having a bottom of semi-circular cross-section whereby, when said confronting faces are in abutting relationship an undulating tunnel is provided by said grooves, said tunnel having over its entire length an uniform oval-shaped cross-section to receive rope parts, the tangent to the portion of the bottom of each groove at each end of said tunnel being parallel to the tangent to the bottom of the opposing groove and spaced an equal distance from a common axis, the tunnel groove being sinuous between the ends, and means for securing said confronting faces in said abutting relationship.

2. A clamp as defined in claim 1 wherein the width of the oval cross-section is equal to the diameter of the semicircular section and the height of the oval cross-section is greater than one and less than two said diameters.

3. A clamp as defined in claim 1 wherein the width of the oval cross-section is equal to the diameter of the semicircular section and the height of the oval section is 1.6 times said diameter.

References Cited by the Examiner

UNITED STATES PATENTS

| 478,822 | 7/1892 | Seward | 24—135 |
| 897,903 | 9/1908 | Kennedy | 287—79 |
| 1,701,812 | 2/1929 | Koerner | 24—81.3 |
| 2,013,437 | 9/1935 | Farrell | 24—135 |
| 2,044,679 | 6/1936 | Frese | 339—246 X |
| 2,348,100 | 5/1944 | Wadsworth | 24—125 X |

FOREIGN PATENTS

| 1,025,428 | 1/1953 | France. |
| 585,674 | 10/1933 | Germany. |

OTHER REFERENCES

German printed application No. 1,042,699, November 1958.

WILLIAM FELDMAN, *Primary Examiner.*

DONLEY J. STOCKING, *Examiner.*

B. R. GAY, *Assistant Examiner.*